United States Patent
Wilhelm et al.

(10) Patent No.: US 9,776,656 B2
(45) Date of Patent: Oct. 3, 2017

(54) ELECTRIC POWER STEERING SYSTEM AND GAIN SETTING METHOD THEREOF

(71) Applicant: JTEKT CORPORATION, Osaka-shi, Osaka (JP)

(72) Inventors: Frederic Wilhelm, Obernai (FR); Tsutomu Tamura, Nara (JP); Robert Fuchs, Yvelines (FR); Philippe Mullhaupt, Geneva (CH)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/075,704

(22) Filed: Mar. 21, 2016

(65) Prior Publication Data

US 2016/0280255 A1 Sep. 29, 2016

(30) Foreign Application Priority Data

Mar. 24, 2015 (JP) ................................. 2015-061155

(51) Int. Cl.
*B62D 5/04* (2006.01)
*B62D 6/00* (2006.01)

(52) U.S. Cl.
CPC ......... *B62D 5/0463* (2013.01); *B62D 5/0409* (2013.01); *B62D 5/0481* (2013.01); *B62D 6/002* (2013.01); *B62D 6/008* (2013.01)

(58) Field of Classification Search
CPC .. B62D 5/0463; B62D 5/0409; B62D 5/0481; B62D 6/002; B62D 6/008
See application file for complete search history.

(56) References Cited

U.S. PATENT DOCUMENTS

| | | |
|---|---|---|
| 2009/0099731 A1 | 4/2009 | Watanabe et al. |
| 2010/0228441 A1 | 9/2010 | Watanabe et al. |
| 2012/0253588 A1 | 10/2012 | Ghoneim |
| 2014/0149000 A1 | 5/2014 | Tamura et al. |
| 2014/0195122 A1* | 7/2014 | Oniwa .................. G05D 17/02 701/41 |

FOREIGN PATENT DOCUMENTS

| | | |
|---|---|---|
| DE | 102012204870 A1 | 10/2012 |
| EP | 2050655 A2 | 4/2009 |
| EP | 2735495 A2 | 5/2014 |
| JP | 2003-170856 A | 6/2003 |
| WO | 02/26547 A1 | 4/2002 |

OTHER PUBLICATIONS

Aug. 3, 2016 Extended Search Report issued in European Patent Application No. 16161223.9.

* cited by examiner

*Primary Examiner* — Michael D Lang
(74) *Attorney, Agent, or Firm* — Oliff PLC

(57) ABSTRACT

In an electric power steering system, an ECU includes a rotation angle calculation unit, an assist torque command value calculation unit, a reference model, an angle deviation calculation unit, a PD control unit, an addition unit, and a plant observer. A proportional gain and a derivative gain which are used in the PD control unit and a first gain and a second gain which are used in a first gain multiplication unit and a second gain multiplication unit of the plant observer are set so that a characteristic equation corresponding to an equation of motion representing behavior of the electric power steering system has a double root.

2 Claims, 9 Drawing Sheets

ELECTRIC POWER STEERING SYSTEM AND GAIN SETTING METHOD THEREOF

INCORPORATION BY REFERENCE

The disclosure of Japanese Patent Application No. 2015-061155 filed on Mar. 24, 2015 including the specification, drawings and abstract, is incorporated herein by reference in its entirety.

BACKGROUND OF THE INVENTION

1. Field of the Invention

The present invention relates to electric power steering systems (EPSs) and gain setting methods thereof.

2. Description of the Related Art

A column assist electric power steering system (hereinafter referred to as the "column EPS") in which an electric motor and a speed reduction mechanism are placed in a column portion is known as an electric power steering system. The column EPS includes a steering wheel, a steering shaft, an intermediate shaft, a steering operation mechanism, an electric motor, a speed reduction mechanism, etc. The steering shaft is formed by an input shaft coupled to the steering wheel, an output shaft coupled to the intermediate shaft, and a torsion bar coupling the input shaft and the output shaft. The electric motor is coupled to the output shaft via the speed reduction mechanism.

As used herein, the term "column" refers to a portion that is formed by a steering wheel, an input shaft, a torsion bar, and an output shaft. The term "power column" refers to a portion that is formed by a steering wheel, an input shaft, a torsion bar, an output shaft, a speed reduction mechanism, an electric motor, and a control device for the electric motor. The term "common column EPS" refers to a column EPS that does not have a function to compensate for friction of a speed reduction mechanism.

In common column EPSs, motor torque (assist torque) generated by an electric motor is transmitted to an output shaft via a speed reduction mechanism. The assist torque thus transmitted to the output shaft is transmitted via an intermediate shaft to a steering operation mechanism including, e.g., a rack and pinion mechanism. For example, the speed reduction mechanism is a worm gear mechanism that is formed by a worm gear and a worm wheel. Since large friction is generated in the speed reduction mechanism, this friction may affect the response of the steering system to steering input.

Methods for compensating for friction that is generated in a speed change mechanism have been developed in order to improve the response of the steering system to the steering input. The easiest friction compensation method is a method in which a certain frictional force is added to an assist torque command value according to the sign of the steering speed.

Japanese Patent Application Publication No. 2003-170856 (JP 2003-170856 A) discloses a method for compensating for friction based on an assist torque command value calculated based on steering torque detected by a torque sensor, and the detected steering torque. Specifically, the magnitude of the frictional force that is generated in the speed reduction mechanism is estimated based on the assist torque command value. The sign of the frictional force in the speed reduction mechanism is determined based on the detected steering torque. The frictional force in the speed reduction mechanism is estimated in this manner. The estimated frictional force in the speed reduction mechanism is added to the assist torque command value.

SUMMARY OF THE INVENTION

It is one object of the present invention to provide an electric power steering system capable of compensating for friction that is generated in a power column and having a non-oscillatory, responsive control system, and a gain setting method in the electric power steering system.

According to one aspect of the present invention, an electric power steering system includes: a power column including an electric motor and a speed reduction mechanism that amplifies motor torque of the electric motor; an assist torque command value calculation unit that sets an assist torque command value of the electric motor; an observer that calculates an estimated value of a rotation angle of the power column and an estimated value of a frictional force that is generated in the power column, by using an observer model in which it is assumed that no friction is generated in the power column and whose characteristic is corrected by using an actual measurement value of a rotation angle of the electric motor and a model correction gain; a reference model in which it is assumed that no friction is generated in the power column and which calculates a target value of the rotation angle of the power column; a feedback manipulated variable calculation unit that calculates a feedback manipulated variable by performing a feedback operation on a deviation between the target value of the rotation angle of the power column and the estimated value of the rotation angle of the power column; a motor torque command value calculation unit that calculates a motor torque command value by correcting the assist torque command value using the estimated value of the frictional force and the feedback manipulated variable; and a motor current control unit that controls a motor current flowing in the electric motor so that the motor torque of the electric motor becomes equal to the motor torque command value. A feedback gain that is used in the feedback manipulated variable calculation unit and the model correction gain that is used in the observer are set so that a characteristic equation corresponding to an equation of motion representing behavior of the electric power steering system has a double root.

The rotation angle of the power column may be a rotation angle of a column shaft (steering shaft) or may be a rotation angle of an output shaft (motor shaft) of the electric motor.

According to this configuration, the estimated value of the frictional force that is generated in the power column is calculated. The motor torque command value is calculated by using the estimated value of the frictional force and the assist torque command value. The friction that is generated in the power column can thus be compensated for. According to this configuration, an electric power steering system with a non-oscillatory, responsive control system is implemented.

Another aspect of the present invention relates to a gain setting method in an electric power steering system including a power column including an electric motor and a speed reduction mechanism that amplifies motor torque of the electric motor, an assist torque command value calculation unit that sets an assist torque command value of the electric motor, an observer that calculates an estimated value of a rotation angle of the power column and an estimated value of a frictional force that is generated in the power column, by using an observer model in which it is assumed that no friction is generated in the power column and whose characteristic is corrected by using an actual measurement value of a rotation angle of the electric motor and a model correction gain, a reference model in which it is assumed that no friction is generated in the power column and which calculates a target value of the rotation angle of the power column, a feedback manipulated variable calculation unit that calculates a feedback manipulated variable by performing a feedback operation on a deviation between the target value of the rotation angle of the power column and the estimated value of the rotation angle of the power column, a motor torque command value calculation unit that calculates a motor torque command value by correcting the assist torque command value using the estimated value of the frictional force and the feedback manipulated variable, and a motor current control unit that controls a motor current flowing in the electric motor so that the motor torque of the electric motor becomes equal to the motor torque command value. A feedback gain that is used in the feedback manipulated variable calculation unit and the model correction gain that is used in the observer are set so that a characteristic equation corresponding to an equation of motion representing behavior of the electric power steering system has a double root.

The rotation angle of the power column may be a rotation angle of a column shaft (steering shaft) or may be a rotation angle of an output shaft (motor shaft) of the electric motor. According to this method, an electric power steering system with a non-oscillatory, responsive control system can be implemented.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment in the case of applying the present invention to a column EPS will be described in detail below with reference to the accompanying drawings.

Figure 1:
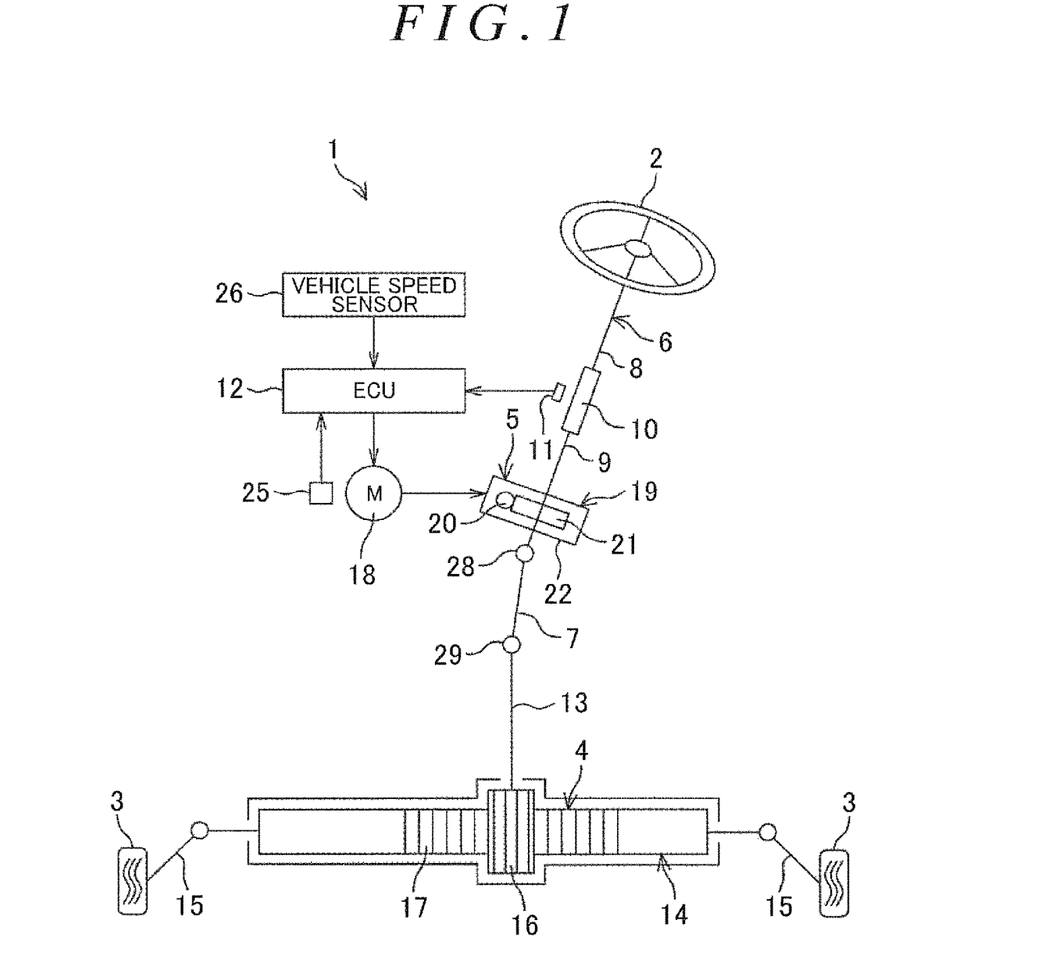
FIG. 1 is a schematic diagram showing the general configuration of a column EPS according to a first embodiment of the present invention.

FIG. 1 is a schematic diagram showing the general configuration of a column EPS according to an embodiment of the present invention.

A column EPS 1 includes a steering wheel 2 serving as a steering member that steers a vehicle, a steering operation mechanism 4 that steers steered wheels 3 according to rotation of the steering wheel 2, and a steering assist mechanism 5 that assists driver's steering operation. The steering wheel 2 and the steering operation mechanism 4 are mechanically coupled to each other via a steering shaft 6, a first universal joint 28, an intermediate shaft 7, and a second universal joint 29.

The steering shaft 6 includes an input shaft 8 coupled to the steering wheel 2 and an output shaft 9 coupled to the intermediate shaft 7. The input shaft 8 and the output shaft 9 are coaxially coupled to each other via a torsion bar 10 so as to be rotatable relative to each other. That is, when the steering wheel 2 is rotated, the input shaft 8 and the output shaft 9 rotate relative to each other and in the same direction. The output shaft 9 is coupled to the intermediate shaft 7 via the first universal joint 28.

A torque sensor 11 is disposed around the steering shaft 6. The torque sensor 11 detects torsion bar torque (steering torque) $T_{tb}$ being applied to the torsion bar 10, based on the relative rotation displacement between the input shaft 8 and the output shaft 9. The torsion bar torque $T_{tb}$ detected by the torque sensor 11 is input to an electronic control unit (ECU) 12.

The steering operation mechanism 4 is a rack and pinion mechanism including a pinion shaft 13 and a rack shaft 14 as a steered shaft. The steered wheels 3 are each coupled to an end of the rack shaft 14 via a tie rod 15 and a knuckle arm (not shown). The pinion shaft 13 is coupled to the intermediate shaft 7 via the second universal joint 29. The pinion shaft 13 rotates according to the steering operation of the steering wheel 2. A pinion 16 is coupled to the tip end of the pinion shaft 13.

The rack shaft 14 extends linearly in the lateral direction of the vehicle (the direction perpendicular to the direction in which the vehicle travels straight). A rack 17 that meshes with the pinion 16 is formed in an intermediate portion in the axial direction of the rack shaft 14. The pinion 16 and the rack 17 convert rotation of the pinion shaft 13 to axial movement of the rack shaft 14. The steered wheels 3 can be steered by moving the rack shaft 14 in the axial direction.

When the steering wheel 2 is steered (rotated), this rotation of the steering wheel 2 is transmitted to the pinion shaft 13 via the steering shaft 6 and the intermediate shaft 7. The rotation of the pinion shaft 13 is converted to axial movement of the rack shaft 14 by the pinion 16 and the rack 17. The steered wheels 3 are steered in this manner.

The steering assist mechanism 5 includes an electric motor 18 and a speed reduction mechanism 19. The electric motor 18 generates a steering assist force, and the speed reduction mechanism 19 amplifies output torque of the electric motor 18 and transmits the amplified output torque to the steering operation mechanism 4. The speed reduction mechanism 19 is a worm gear mechanism that includes a worm gear 20 and a worm wheel 21 meshing with the worm gear 20. The speed reduction mechanism 19 is accommodated in a gear housing 22 serving as a transmission mechanism housing. In the following description, "i" represents the speed reduction ratio (gear ratio) of the speed reduction mechanism 19. The speed reduction ratio i is defined as the ratio $\omega_{wg}/\omega_{ww}$ of the angular velocity $\omega_{wg}$ of the worm gear 20 to the angular velocity $\omega_{ww}$ of the worm wheel 21.

The worm gear 20 is rotationally driven by the electric motor 18. The worm wheel 21 is coupled to the steering shaft 6 so as to be rotatable in the same direction as the steering shaft 6. The worm wheel 21 is rotationally driven by the worm gear 20.

When the driver steers the steering wheel 2, the worm gear 20 is rotationally driven by the electric motor 18. The worm wheel 21 is thus rotationally driven, whereby motor torque is applied to the steering shaft 6 and the steering shaft 6 is rotated. The rotation of the steering shaft 6 is transmitted to the pinion shaft 13 via the intermediate shaft 7. Rotation of the pinion shaft 13 is converted to axial movement of the rack shaft 14, whereby the steered wheels 3 are steered. That is, the steering operation can be assisted by the electric motor 18 as the worm gear 20 is rotational driven by the electric motor 18.

Torque that is applied to the speed reduction mechanism 19 includes motor torque that is generated by the electric motor 18 and external torque other than the motor torque. The external torque other than the motor torque includes driver torque that is applied to the steering wheel 2 by the driver and load torque (load) that is applied to the rack shaft 14 (speed reduction mechanism 19) from the steered wheel 3 side. The driver torque is detected as the torsion bar torque $T_{tb}$.

The rotation angle (rotor rotation angle) of a rotor of the electric motor 18 is detected by a rotation angle sensor 25 such as a resolver. The vehicle speed is detected by a vehicle speed sensor 26. An output signal of the rotation angle sensor 25 and the vehicle speed V detected by the vehicle speed sensor 26 are input to the ECU 12. The electric motor 18 is controlled by the ECU 12 as a motor control device.

Figure 2:
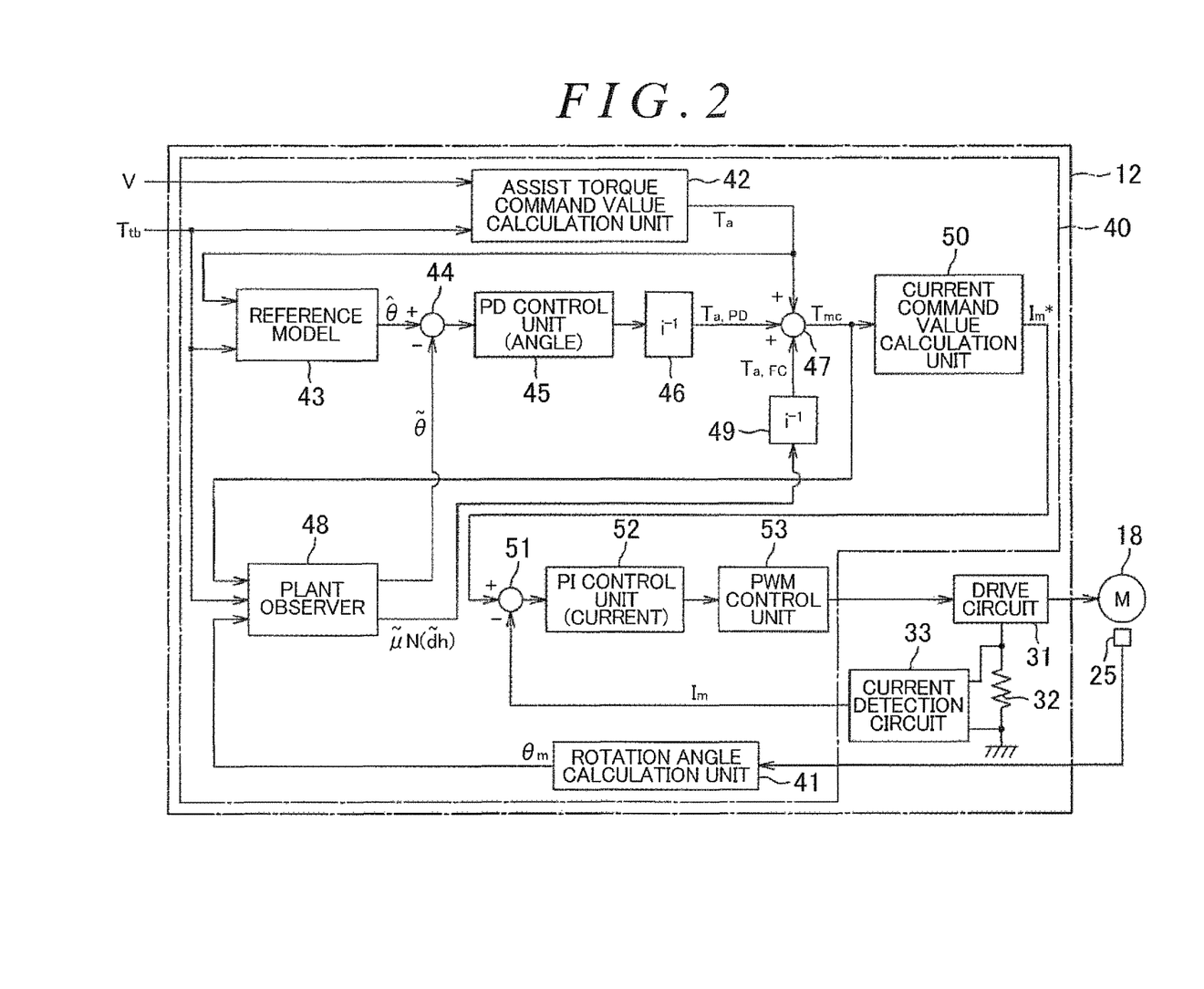
FIG. 2 is a schematic diagram showing the electrical configuration of an ECU of FIG. 1.

FIG. 2 is a schematic diagram showing the electrical configuration of the ECU 12.

The ECU 12 implements appropriate steering assistance depending on the steering condition by driving the electric motor 18 according to the torsion bar torque $T_{tb}$ detected by the torque sensor 11, the vehicle speed V detected by the vehicle speed sensor 26, and the rotation angle $\theta_m$ of the electric motor 18 calculated based on the output of the rotation angle sensor 25. The ECU 12 implements friction compensation for reducing the influence of friction in a power column by drivingly controlling the electric motor 18. In the present embodiment, the electric motor 18 is a direct-current (DC) motor with a brush. In the following description, the rotation angle of the steering shaft (column shaft) 6 is referred to as the "column rotation angle $\theta$." The rotation angle of the steering shaft 6 is an example of the rotation angle of the power column.

The ECU 12 includes a microcomputer 40, a drive circuit (H-bridge circuit) 31, a current detection resistor (shunt resistor) 32, and a current detection circuit 33. The drive circuit 31 is controlled by the microcomputer 40 to supply electric power to the electric motor 18. The current detection resistor 32 and the current detection circuit 33 are provided to detect a current flowing in the electric motor 18 (hereinafter this current is referred to as the "motor current").

The microcomputer 40 includes a central processing unit (CPU) and a memory (a read only memory (ROM), a random access memory (RAM), a nonvolatile memory, etc.). The microcomputer 40 functions as a plurality of functional processing units by executing a predetermined program. The plurality of functional processing units include a rotation angle calculation unit 41, an assist torque command value calculation unit 42, a reference model 43, an angle deviation calculation unit 44, a proportional-derivative (PD) control unit 45, a first speed reduction ratio division unit 46, an addition unit 47, a plant observer 48, a second speed reduction ratio division unit 49, a current command value calculation unit 50, a current deviation calculation unit 51, a proportional-integral (PI) control unit 52, and a pulse width modulation (PWM) control unit 53.

The rotation angle calculation unit 41 calculates the rotation angle $\theta_m$ of an output shaft of the electric motor 18 (hereinafter this rotation angle is referred to as the "motor rotation angle $\theta_m$") based on the output signal of the rotation angle sensor 25.

The assist torque command value calculation unit 42 calculates an assist torque command value $T_a$ based on the vehicle speed V detected by the vehicle speed sensor 26 and the torsion bar torque $T_{tb}$ detected by the torque sensor 11.

The reference model 43 calculates a target value $\hat{\theta}$ of the column rotation angle $\theta$ (hereinafter this target value is referred to as the "column rotation angle target value $\hat{\theta}$) on the assumption that no friction is generated in the power column, based on the torsion bar torque $T_{tb}$ and the assist torque command value $T_a$. A virtual column EPS model in which no friction is generated in a power column is hereinafter referred to as the "frictionless column EPS model." The reference model 43 is formed by a frictionless column EPS model. The frictionless column EPS model will be described later.

The angle deviation calculation unit 44 calculates the angle deviation $\Delta\theta$ ($=\hat{\theta}-\tilde{\theta}$) between the column rotation angle target value $\hat{\theta}$ that is output from the reference model 43 and a column rotation angle estimated value $\tilde{\theta}$ that is output from the plant observer 48.

The PD control unit 45 perfoilus PD calculation on the angle deviation $\Delta\theta$ calculated by the angle deviation calculation unit 44. Specifically, the PD control unit 45 calculates $\{k_p(\hat{\theta}-\tilde{\theta})+k_v(d\hat{\theta}/dt-d\tilde{\theta}/dt)\}$, where "$k_p$" represents a proportional gain and "$k_v$" represents a derivative gain. The first speed reduction ratio division unit 46 calculates a first assist torque correction values $T_{a,PD}$ by dividing the calculation result of the PD control unit 45 by the speed reduction ratio i of the speed reduction mechanism 19.

The second speed reduction ratio division unit 49 calculates a second assist torque correction value $T_{a,FC}$ (friction compensation value) by dividing a frictional force estimated value $\mu N(\tilde{d}h)$ calculated by the plant observer 48 by the speed reduction ratio i of the speed reduction mechanism 19. Operation of the plant observer 48 will be described later.

The addition unit 47 calculates a motor torque command value $T_{mc}$ by adding the assist torque command value $T_a$ calculated by the assist torque command value calculation unit 42, the first assist torque correction value $T_{a,PD}$ calculated by the first speed reduction ratio division unit 46, and the second assist torque correction value $T_{a,FC}$ calculated by the second speed reduction ratio division unit 49.

The current command value calculation unit 50 calculates a current command value $I_m^*$ by dividing the motor torque command value $T_{mc}$ calculated by the addition unit 47 by a torque constant of the electric motor 18. The current deviation calculation unit 51 calculates the deviation $\Delta I_m (=I_m^* - I_m)$ between the current command value $I_m^*$ calculated by the current command value calculation unit 50 and an actual motor current $I_m$ detected by the current detection circuit 33. The PI control unit 52 calculates a voltage command value to be applied to the electric motor 18 by performing PI calculation on the current deviation $\Delta I_m$ calculated by the current deviation calculation unit 51.

The PWM control unit 53 generates a PWM signal with a duty corresponding to the voltage command value calculated by the PI control unit 52 and applies the PWM signal to the motor drive circuit 31. The motor drive circuit 31 is an H-bridge circuit and includes a plurality of power elements. The plurality of power elements are turned on or off based on the PWM signal received from the PWM control unit 53, whereby a voltage according to the voltage command value is applied to the electric motor 18.

The current deviation calculation unit 51 and the PI control unit 52 form a current feedback controller. The current feedback controller controls the motor current flowing in the electric motor 18 so that the motor current becomes closer to the current command value $I_m^*$.

Figure 3:
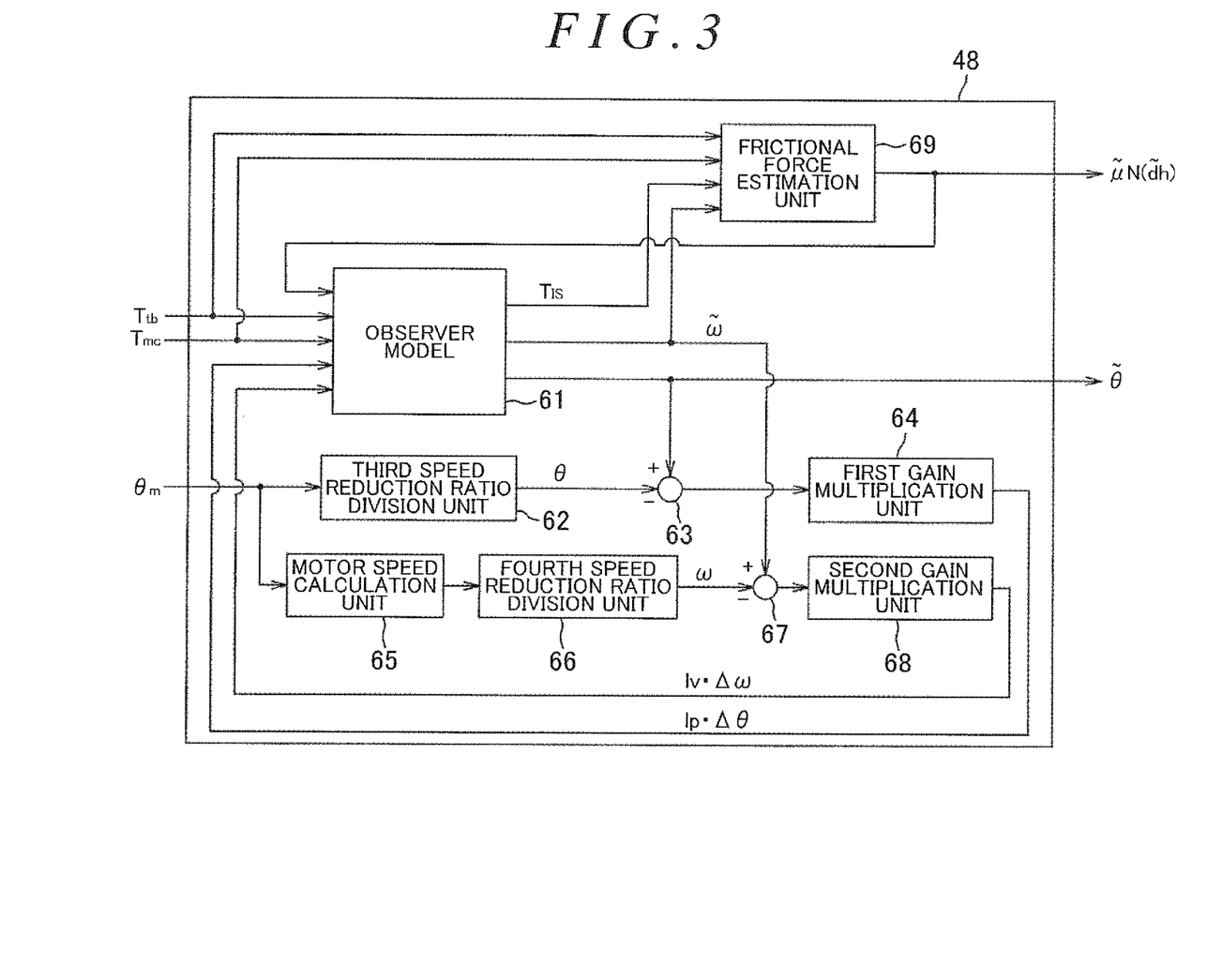
FIG. 3 is a block diagram showing the configuration of a plant observer.

FIG. 3 is a block diagram showing the configuration of the plant observer 48.

The plant observer 48 includes an observer model 61 formed by a frictionless column EPS model, a third speed reduction ratio division unit 62, an angle deviation calculation unit 63, a first gain multiplication unit 64, a motor speed calculation unit 65, a fourth speed reduction ratio division unit 66, an angular velocity deviation calculation unit 67, a second gain multiplication unit 68, and a frictional force estimation unit 69.

The frictional force estimated value $\mu N(\tilde{dh})$ calculated by the frictional force estimation unit 69, the torsion bar torque $T_{tb}$ detected by the torque sensor 11, the motor torque command value $T_{mc}$ calculated by the addition unit 47 (see FIG. 2), a first model correction term $l_p \cdot \Delta\theta$, and a second model correction term $l_v \cdot \Delta\omega$ are input to the observer model 61. Based on these inputs, the observer model 61 calculates the column rotation angle estimated value $\tilde{\theta}$ and a column angular velocity estimated value $\tilde{\omega}(=d\tilde{d}/dt)$ on the assumption that no friction is generated in the power column, and also calculates load torque (load) $T_{ls}$.

The torsion bar torque $T_{tb}$ detected by the torque sensor 11, the motor torque command value $T_{mc}$ calculated by the addition unit 47 (see FIG. 2), and the load torque $T_{ls}$ and the column angular velocity estimated value $\tilde{\omega}(=d\tilde{\theta}/dt)$ calculated by the observer model 61 are input to the frictional force estimation unit 69. The frictional force estimation unit 69 calculates the frictional force estimated value $\mu N(\tilde{dh})$, which is an estimated value of the frictional force that is generated in the power column, based on these inputs. The frictional force estimation unit 69 will be described in detail later.

The third speed reduction ratio division unit 62 calculates an actual column rotation angle $\theta$ by dividing the rotation angle $\theta_m$ of the electric motor 18 calculated by the rotation angle calculation unit 41 by the reduction ratio i $(=\omega_{wg}/\omega_{ww})$ of the speed reduction mechanism 19.

The angle deviation calculation unit 63 calculates the angle deviation $\Delta\theta(=\theta-\tilde{\theta})$ between the actual column rotation angle $\theta$ calculated by the third speed reduction ratio division unit 62 and the column rotation angle estimated value $\tilde{\theta}$ calculated by the observer model 61. The first gain multiplication unit 64 calculates the first model correction term (position) $l_p \cdot \Delta\theta$ by multiplying the angle deviation $\Delta\theta$ calculated by the angle deviation calculation unit 63 by a preset first gain $l_p$.

The motor speed calculation unit 65 calculates the angular velocity of the rotor of the electric motor 18 (hereinafter this angular velocity is referred to as the "actual motor angular velocity $\omega_m$") by differentiating the motor rotational angle $\theta_m$ calculated by the rotation angle calculation unit 41 with respect to time.

The fourth speed reduction ratio division unit 66 calculates the actual column angular velocity $\omega(=d\theta/dt)$ by dividing the actual motor angular velocity $\omega_m$ calculated by the motor speed calculation unit 65 by the speed reduction ratio i $(=\omega_{wg}/\omega_{ww})$ of the speed reduction mechanism 19.

The angular velocity deviation calculation unit 67 calculates the angular velocity deviation $\Delta\omega(=\omega-\tilde{\omega})$ between the actual column angular velocity $\omega$ calculated by the fourth speed reduction ratio division unit 66 and the column angular velocity estimated value $\tilde{\omega}$ calculated by the observer model 61. The second gain multiplication unit 68 calculates the second model correction term (velocity) $l_v \cdot \Delta\omega$ by multiplying the angular velocity deviation $\Delta\omega$ calculated by the angular velocity deviation calculation unit 67 by a preset second gain $l_v$.

The first model correction term (position) $l_p \cdot \Delta\theta$ and the second model correction term (velocity) $l_v \cdot \Delta\omega$ are used to correct characteristics (structure) of the observer model 61. That is, the characteristics (structure) of the observer model 61 are corrected so that the column rotation angle estimated value $\tilde{\theta}$ that is calculated by the observer model 61 becomes equal to the actual column rotation angle $\theta$ and the column angular velocity estimated value $\tilde{\omega}$ that is calculated by the observer model 61 becomes equal to the actual column angular velocity $\omega$.

The plant observer 48 outputs the column rotation angle estimated value $\tilde{\theta}$ calculated by the observer model 61 and the frictional force estimated value $\mu N(\tilde{dh})$ calculated by the frictional force estimation unit 69.

Figure 4:
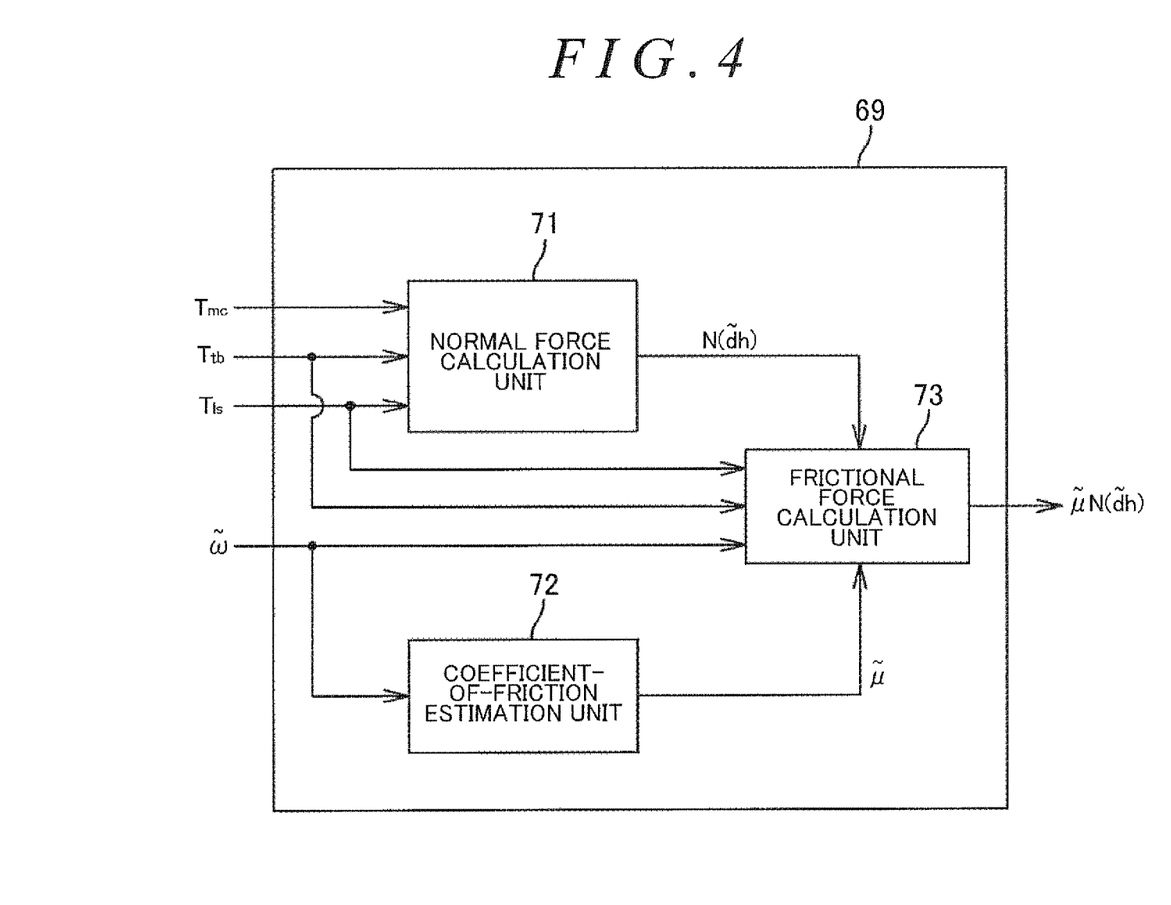
FIG. 4 is a block diagram showing the configuration of a frictional force estimation unit.

FIG. 4 is a block diagram showing the configuration of the frictional force estimation unit 69.

The frictional force estimation unit 69 includes a normal force calculation unit 71, a coefficient-of-friction estimation unit 72, and a frictional force calculation unit 73. The frictional force estimation unit 69 estimates the frictional force that is generated in the power column by using a simulation model and a friction model of a column EPS. The simulation model and the friction model of the column EPS which are used by the frictional force estimation unit 69 will be described.

Figure 5:
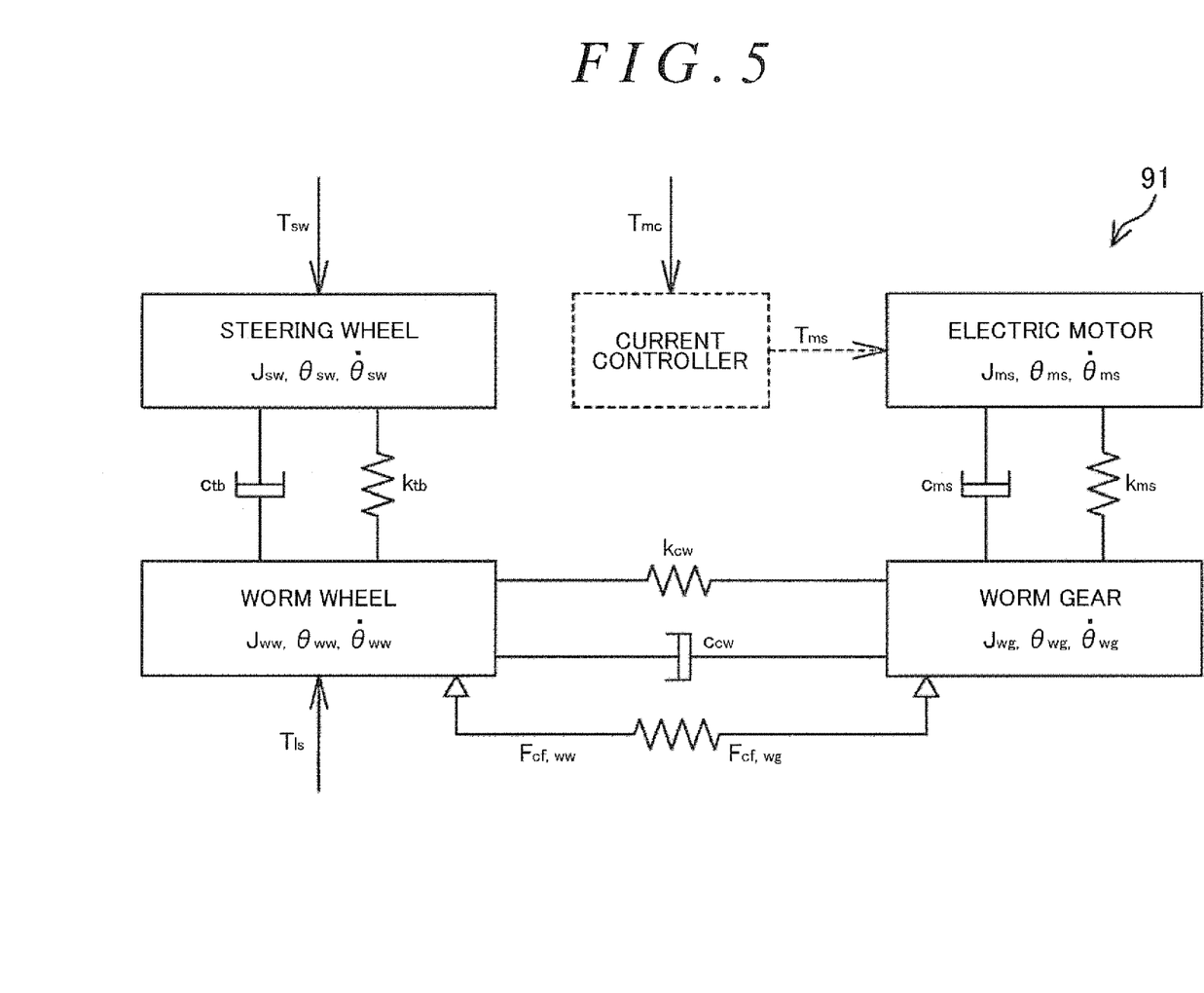
FIG. 5 is a schematic diagram showing the configuration of a simulation model (complete EPS model) of a common column EPS.

FIG. 5 is a schematic diagram showing the configuration of the simulation model of a common column EPS (hereinafter this simulation model is referred to as the "complete EPS model").

This complete EPS model 91 is a model with four degrees of freedom. The motor torque command value $T_{mc}$, the driver torque $T_{sw}$ on the steering wheel 2, the load torque $T_{ls}$ that is transmitted through a lower shaft, and the vehicle speed V, not shown, are input in the complete EPS model 91. The torsion bar torque $T_{tb}$, the rotation angle $\theta_{ms}$ of a motor shaft, and the vehicle speed V can be detected.

The complete EPS model 91 includes four kinds of inertia, i.e., inertia of the steering wheel, inertia of the worm wheel, inertia of the worm gear, and inertia of the motor shaft. The speed reduction mechanism (worm gear mechanism) is formed by the worm gear and the worm wheel. The driver torque $T_{sw}$ and the load torque $T_{ls}$ are directly applied to the steering wheel and the worm wheel, respectively. The motor torque command value $T_{mc}$ is applied to a motor current controller (current controller) in an ECU. The ECU in this simulation model 91 is a common ECU that does not have a friction compensation function. For example, this ECU calculates the motor torque command value $T_{mc}$ based on the torsion bar torque $T_{tb}$ and the vehicle speed V and performs feedback control so that a current flowing in the electric motor becomes equal to a current value corresponding to the motor torque command value $T_{mc}$.

In FIG. 5, "J" represents inertia, "$\theta$" represents a rotation angle, "$d\theta/dt$" represents an angular velocity or a velocity, "k" represents a coefficient of stiffness (coefficient of spring), and "c" represents a coefficient of viscosity. Regarding friction, two kinds of friction $F_{cf,ww}$, $F_{cf,wg}$ in the meshing part of the speed reduction mechanism are considered, and other kinds of friction such as friction of a bearing are ignored. The subscript "sw" represents the steering wheel, "tb" represents the torsion bar, "ww" represents the worm wheel, "wg" represents the worm gear, and "ms" represents the motor shaft.

Equations of motion of the four kinds of inertia are given by the following expressions (1) to (4).

Steering Wheel $$J_{sw}\ddot{\theta}_{sw}=T_{sw}-k_{tb}(\theta_{sw}-\theta_{ww})-c_{tb}(\dot{\theta}_{sw}-\dot{\theta}_{ww}) \qquad (1)$$

Worm Wheel $$J_{ww}\ddot{\theta}_{ww}=k_{tb}(\theta_{sw}-\theta_{ww})-c_{tb}(\dot{\theta}_{sw}-\dot{\theta}_{ww})+T_{c,ww}+T_{ls} \qquad (2)$$

Worm Gear $$J_{wg}\ddot{\theta}_{wg}=k_{ms}(\theta_{ms}-\theta_{wg})-c_{ms}(\dot{\theta}_{ms}-\dot{\theta}_{wg})+T_{c,wg} \qquad (3)$$

Assist Motor Rotor $$J_{ms}\ddot{\theta}_{ms}=T_{ms}-k_{ms}(\theta_{ms}-\theta_{wg})-c_{ms}(\dot{\theta}_{ms}-\dot{\theta}_{wg}) \qquad (4)$$

In the expressions, "$T_{c,ww}$," and "$T_{c,wg}$" represent interaction torque between the worm wheel and the worm gear. The interaction torque $T_{c,ww}$, $T_{c,wg}$ in Expressions (2), (3) can be calculated by using a meshing model of the worm gear and the worm wheel shown in FIG. 6.

Figure 6:
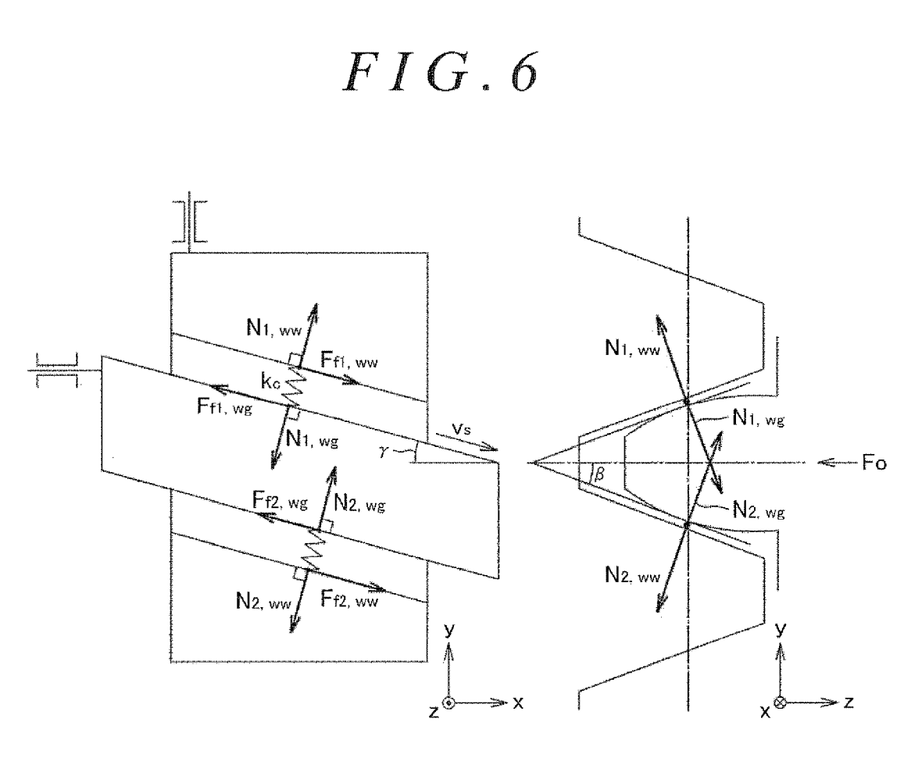
FIG. 6 is a schematic diagram showing a meshing model of a worm gear mechanism.

In FIG. 6, the x-axis and the y-axis are tangents to a meshing point on pitch circles of the worm gear and the worm wheel. The z-axis is the direction extending in the common radial directions of the worm gear and the worm wheel. Rotation of the worm wheel corresponds to movement in the y-direction, and rotation of the worm gear corresponds to movement in the x-direction. It is herein assumed that the pressure angle β is always constant. It is also assumed that the frictional force between the tooth surfaces is applied in the direction of the lead angle γ.

When the EPS system is in a stopped state, each tooth of the worm gear meshing with the worm wheel contacts two points of the worm wheel, namely upper and lower points of the worm wheel, due to a preload $F_0$. This state is herein referred to as the "two-point contact state."

Interaction forces $\vec{F}_{c,ww}$, $\vec{F}_{c,wg}$ between the worm wheel and the worm gear are comprised of the normal force $\vec{N}_{i,xx}$ and the frictional force $\vec{F}_{fi,xx}$ that are generated at the two contact points i (where "xx" is ww or wg, and "i" is 1, 2). The interaction forces $\vec{F}_{c,ww}$, $\vec{F}_{c,wg}$ are given by the following expressions (5), (6).

$$\vec{F}_{c,ww}=\vec{N}_{1,wg}+\vec{F}_{f1,wg}+\vec{N}_{2,wg}+\vec{F}_{f2,wg} \qquad (5)$$

$$\vec{F}_{c,wg}=\vec{N}_{1,ww}+\vec{F}_{f1,ww}+\vec{N}_{2,ww}+\vec{F}_{f2,ww} \qquad (6)$$

The normal force $\vec{N}_{1,xx}$ is generated by material strain represented by a spring having a coefficient kc. The amounts of compression of upper and lower springs are given by "$h_1=(h_0+dh)+$" and "$h_2=(h_0-dh)+$," respectively, where "$h_0$" represents the amount of compression caused by the preload when the system is in a stopped state, and "dh" represents the relative position of a tooth. "(A)+" is such a function that (A)+=A when A≥0 and (A)+=0 when A<0. The normal force $\vec{N}_{1,xx}$ the normal force $\vec{N}_{2,xx}$ are given by the following expressions (7), (8).

$$\|\vec{N}_{1,wg}\|=\|\vec{N}_{1,ww}\|=k_c(h_0+dh)+ \qquad (7)$$

$$\|\vec{N}_{2,wg}\|=\|\vec{N}_{2,ww}\|=k_c(h_0-dh)+ \qquad (8)$$

If the amount of compression of the upper or lower spring becomes zero, the corresponding contact point is lost. The state where one of the two contact points is lost is herein referred to as the "one-point contact state."

The amount of compression $h_0$ at the time the system is in the stopped state has a value according to the preload $F_0$, the coefficient of stiffness kc, and the pressure angle γ, as given by the following expression (9).

$$h_0=F_0/2k_c\sin(\beta) \qquad (9)$$

The relative displacement dh is a function of the relative rotation angle of the worm wheel and the worm gear, as given by the following expression (10).

$$dh=r_{wg}\theta_{wg}\sin(\gamma)-r_{ww}\theta_{ww}\cos(\gamma) \qquad (10)$$

In this expression, "$r_{wg}$" represents the pitch radius of the worm gear, and "$r_{ww}$" represents the pitch radius of the worm wheel.

The frictional force $F_{fi,xx}$ is given by the following expression (11) by using the normal force $\|\vec{N}_{1,xx}\|$ and the coefficient of friction μ (it is herein assumed that the coefficient of friction μ is the same at the two contact points).

$$F_{f1,xx}=\mu\|\vec{N}_{1,xx}\| \qquad (11)$$

The above expressions (5), (6) are rewritten to the following expressions (12), (13) by being projected on the axis of motion by using the above expressions (7), (8), (11).

$$F_{cy,ww}=F_C(dh)\cos(\gamma)\cos(\beta)-\mu F_N(dh)\sin(\gamma) \qquad (12)$$

$$F_{cx,wg}=-F_C(dh)\sin(\gamma)\cos(\beta)-\mu F_N(dh)\cos(\gamma) \qquad (13)$$

In the above expressions (12), (13), "$F_C(dh)$" represents an equivalent contact force, and "$F_N(dh)$" is an equivalent normal force. $F_C(dh)$ and $F_N(dh)$ are given by the following expressions (14), (15).

$$F_C(dh)=k_c((h_0+dh)+-(h_0-dh)+) \qquad (14)$$

$$F_N(dh)=k_c((h_0+dh)++(h_0-dh)+) \qquad (15)$$

Figure 7:
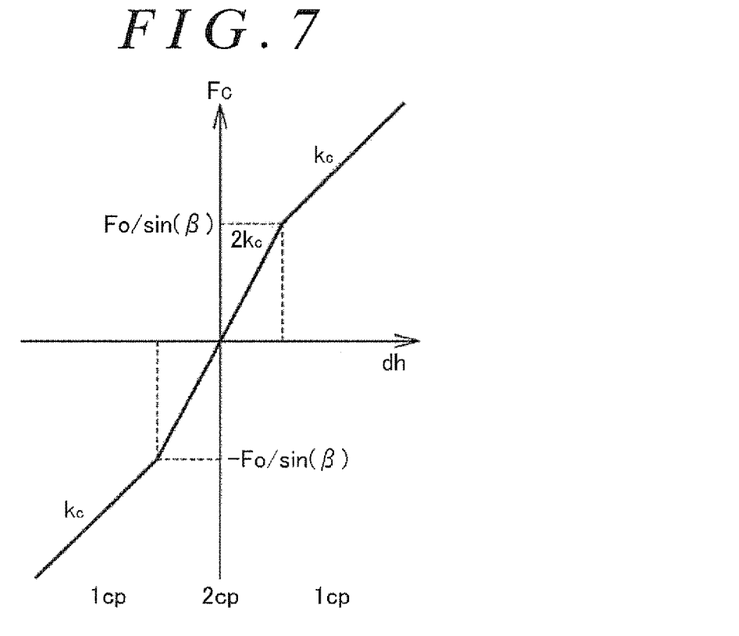
FIG. 7 is a graph showing a function $F_C(dh)$.
Figure 8:
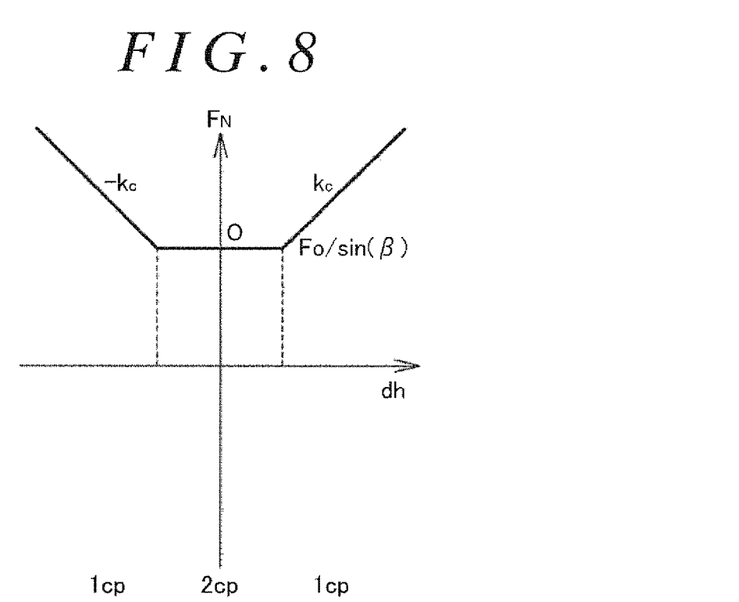
FIG. 8 is a graph showing a function $F_N(dh)$.

FIG. 7 shows the function $F_C(dh)$, and FIG. 8 shows the function $F_N(dh)$. In FIGS. 7 and 8, "2cp" represents the two-point contact state where |dh|≤0, and "1ep" represents the one-point contact state where |dh|>0.

Lastly, the interaction forces $F_{cy,ww}$, $F_{cx,wg}$ are converted to torque $T_{c,ww}$, $T_{c,wg}$ by multiplying the interaction forces $F_{cy,ww}$, $F_{cx,wg}$ by the pitch radius, as given by the following expressions (16), (17).

$$T_{c,ww}=r_{ww}F_{cy,ww} \qquad (16)$$

$$T_{c,wg}=r_{ww}F_{cx,wg} \qquad (17)$$

A friction model that is used to calculate the coefficient of friction μ of a meshing part of a gear will be described. In the present embodiment, a LuGre model is used as the friction model. The coefficient of friction μ in the LuGre model is given by the following expression (18) using the sliding velocity $v_s$ between two objects and the amount of deflection p of a brush.

$$\mu = \sigma_0 p + \sigma_1 \dot{p} + \sigma_2 v_s \qquad (18)$$

$$\dot{p} = v_s - \sigma_0 \frac{|v_s|}{g(v_s)} p$$

$$g(v_s) = \mu_c + (\mu_{ba} - \mu_c)e^A$$

$$A = -(|v_s|/v_{sb})^2$$

In this expression, "$\mu_c$" represents a Coulomb friction coefficient, "$\mu_{ba}$" represents a maximum friction coefficient, "$v_{sb}$" represents a sliding velocity that provides the Stribeck effect, "$\sigma_0$" represents the coefficient of stiffness of the brush, and "$\sigma_1$" represents the damping coefficient of the brush, and "$\sigma_2$" represents a coefficient of viscous friction. These six parameters are obtained experimentally. The sliding velocity $v_s$ as an input in the LuGre model is given by the following expression (19).

$$v_s = r_{ww} \cdot d\theta_{ww}/dt \cdot \sin(\gamma) + r_{wg} \cdot d\theta_{wg}/dt \cdot \cos(\gamma) \quad (19)$$

Figure 9:
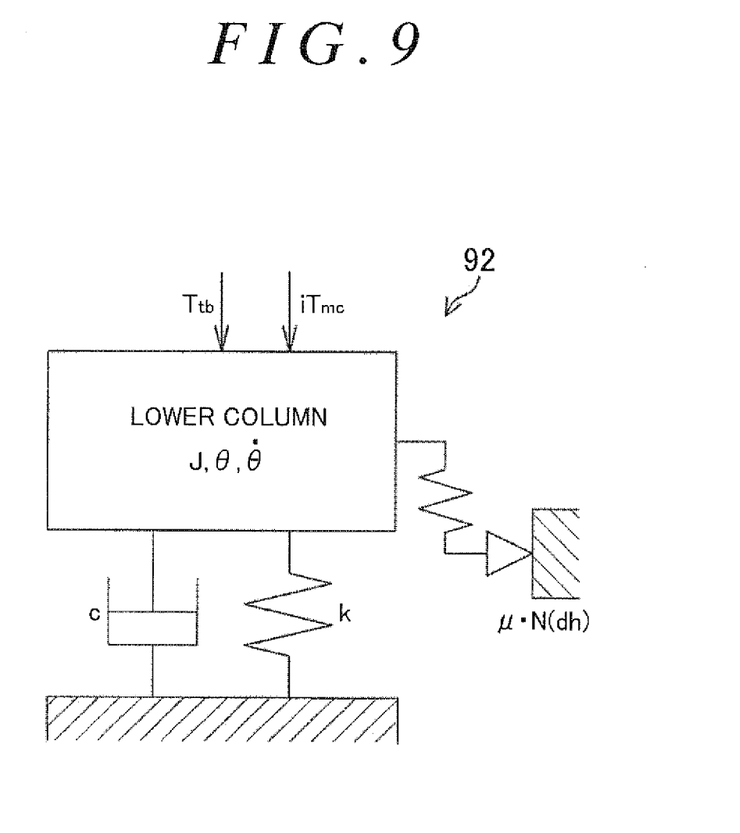
FIG. 9 is a schematic diagram showing the configuration of a simulation model (simplified EPS model) as a simplified model of the model of the power column in FIG. 5.

In the present embodiment, the frictional force estimation unit 69 estimates the friction (friction to be compensated for) in the power column by using a simulation model that is a simplified model of the complete EPS model 91 of FIG. 5 (hereinafter this simulation model is referred to as the "simplified EPS model 92").

FIG. 9 is a schematic diagram showing the configuration of the simplified EPS model 92.

In the simplified EPS model 92, the motor torque command value $T_{mc}$ is considered to be equal to the motor shaft torque $T_{ms}$. Moreover, the rotation angle $\theta_{ms}$ of the motor shaft is considered to be equal to the rotation angle $\theta_{wg}$ of the worm gear, as given by the following expression (20).

$$\theta_{ms} = \theta_{wg} \quad (20)$$

In the simplified EPS model 92, the rotation angle $\theta_{ww}$ of the worm wheel is considered to be equal to the product of the speed reduction ratio i and the rotation angle $\theta_{wg}$ of the worm gear, as given by the following expression (21).

$$\theta_{ww}(t) = i\theta_{wg}(t) \quad (21)$$

In the simplified EPS model 92, the speed reduction ratio i is represented by using the pitch radii $r_{ww}$, $r_{wg}$ and the lead angle $\gamma$ of the worm wheel and the worm gear, as given by the following expression (22).

$$i = (r_{ww}/r_{wg}) \cdot \cot(\gamma) \quad (22)$$

That is, in the simplified EPS model 92, the number of kinds of inertia is reduced to one, namely $J = J_{ww} + i^2(J_{wg} + J_{ms})$ where the rotation angle of the column is $\theta$.

Although the worm wheel and the worm gear are unified in this simplified EPS model 92, the influence of the contact state is calculated as the contact state affects the frictional force.

The torsion bar torque $T_{tb}$ is directly input in the simplified EPS model 92. The simplified EPS model 92 therefore does not include a steering wheel. A reverse input (load torque) $T_{ls}$ to the lower shaft is not measured. However, the load torque $T_{ls}$ can be measured via a vehicle model. As a first approach, a simple spring-damper shaft is typically used as a self-aligning reaction of a wheel. The load torque $T_{ls}$ is given by the following expression (23).

$$T_{ls} = -k\theta - c(d\theta/dt) \quad (23)$$

In this expression, "k" and "c" represent the coefficient of stiffness and the coefficient of viscosity of the vehicle model, respectively.

The sliding velocity $v_s$ of a meshing part of a gear for the simplified EPS model 92 is given by the following expression (24) by using the expressions (19), (21), (22).

$$v_s = r_{ww}(d\theta/dt)/\sin(\gamma) \quad (24)$$

In the simplified EPS model 92, the above equations of motion (2), (3), (4) are given by the following expression (25).

$$J\ddot{\theta} = T_{tb} + iT_{ms} - k\theta - c\dot{\theta} - \mu N(dh) \quad (25)$$

In this expression, "$\mu$" represents the coefficient of friction, "N(dh)" represents the equivalent normal force torque (hereinafter referred to as the "normal force N(dh)") according to the load condition dh of the speed reduction mechanism and is given by the following expression (26).

$$N(dh) = \{r_{ww}/\sin(\gamma)\}F_N(dh) \quad (26)$$

Referring back to FIG. 4, the normal force calculation unit 71 calculates the normal force N(dh).

The external torque $T_{ww}$ on the worm wheel is "$T_{ww} = T_{tb}T_{ls}$." The inertia on the worm gear side is "$J_{wg} + J_{ms}$," and the external torque is the motor shaft torque $T_{ms}$. In a stable state, $\ddot{\theta}_{ww} = i\ddot{\theta}_{wg} = i\ddot{\theta}_{ms}$.

The following expression is obtained by applying these expressions to the above equations of motion (2), (3), (4).

$$(1/J_{ww})(T_{ww} + r_{ww}\cos(\gamma)\cos(\beta)F_C(dh) - r_{ww}\mu\sin(\gamma)F_N(dh)) = (1/i(J_{wg} + J_{ms}))(T_{ms} - r_{wg}\sin(\gamma)\cos(\beta)F_C(dh) - r_{wg}\mu\cos(\gamma)F_N(dh)) \quad (27)$$

If it is assumed that the friction term $\mu F_N(dh)$ can be ignored ($\mu F_N(dh) = 0$) as compared to the normal force term $F_C(dh)$, $F_C(dh)$ is given by the following expression (28).

$$F_C(dh) = iJ_{ww}T_{ms} - i^2(J_{wg} + J_{ms})(T_{ww})/(r_{ww}\cos(\gamma)\cos(\beta)J) \quad (28)$$

The normal force calculation unit 71 calculates the value dh based on the expression (28) and the above expression (14) (see the graph of FIG. 7). The normal force calculation unit 71 calculates $F_N(dh)$ by substituting the calculated value dh and the value h0 calculated based on the above expression (9) for the above expression (15). The normal force calculation unit 71 also calculates the normal force N(dh) (normal force estimated value N($\tilde{dh}$)) by substituting $F_N(dh)$ for the above expression (26).

The coefficient-of-friction estimation unit 72 calculates the sliding velocity $v_s$ based on the above expression (24). At this time, the column angular velocity estimated value $\omega$ calculated by the observer model 61 is used as "$d\theta/dt$" of the above expression (24). The coefficient-of-friction estimation unit 72 calculates a coefficient-of-friction estimated value $\tilde{\mu}$ by substituting the calculated sliding velocity $v_s$ for the above expression (18). The frictional force calculation unit 73 calculates an estimated value $\tilde{\mu}N(\tilde{dh})$ of the frictional force by multiplying the normal force estimated value N($\tilde{dh}$) calculated by the normal force calculation unit 71 by the coefficient-of-friction estimated value $\tilde{\mu}$ calculated by the coefficient-of-friction estimation unit 72.

In the present embodiment, the frictional force estimation unit 69 estimates the friction that is generated in the speed reduction mechanism 19, based on the simplified EPS model 92 in which the friction that is generated in the speed reduction mechanism 19 is considered. The motor torque command value is calculated by using the estimated friction and the assist torque command value. The friction that is generated in the speed reduction mechanism 19 can thus be compensated for.

In the present embodiment, the simplified EPS model 92 of FIG. 9 having the friction $\mu N(dh)$ in the power column removed therefrom is used as the reference model 43 and the observer model 61.

A method for setting the proportional gain $k_p$ and the derivative gain $k_v$ (feedback gains) that are used by the PD control unit 45, the first gain $l_p$ (model correction gain) that is used by the first gain multiplication unit 64 in the plant observer 48, and the second gain $l_v$ (model correction gain) that is used by the second gain multiplication unit 68 in the plant observer 48 will be described.

Figure 10:
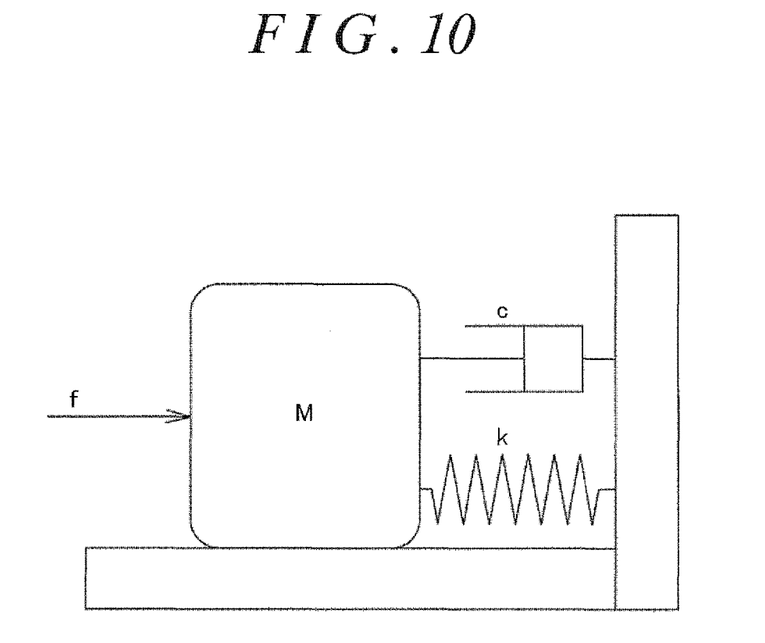
FIG. 10 is a schematic diagram showing a model of a single-mass system having a spring, mass, and a damper element.

FIG. 10 shows a model of a single-mass system having a spring, mass, and a damper element.

An equation of motion of this model is given by the following expression (29).

$$m \cdot d^2x/dt + c \cdot dx/dt + kx = f \quad (29)$$

In this expression, "m" represents mass, "c" represents a damping coefficient, "k" represents a coefficient of spring (coefficient of stiffness), "d²x/dt" represents acceleration, "dx/dt" represents a velocity, "x" represents displacement, and "f" represents an external force.

The following expression (30) is obtained by Laplace transform of the expression (29).

$$(ms^2+cs+k)X = F \quad (30)$$

In this expression, "X" represents Laplace transform of the displacement, "F" represents Laplace transform of the external force, and "s" represents a Laplace operator.

The transfer function H(s) is given by the following expression (31).

$$H(s) = X(s)/F(s) = 1/(ms^2+cs+k) \quad (31)$$

The denominator of the right side of the expression (31) is called a characteristic equation ($ms^2+cs+k=0$).

The root of the characteristic equation is given by the following expression (32).

$$s = \{-c \pm \sqrt{(c^2-4mk)}\}/2m \quad (32)$$

In the case where the root of the characteristic equation is a double root, this corresponds to the boundary between oscillatory behavior and non-oscillatory behavior (critical damping).

When the critical damping coefficient cc is $2\sqrt{(mk)}$ and the damping ratio $\zeta$ is c/cc, the characteristic equation is given by the following expression (33).

$$s^2 + 2\zeta\sqrt{(k/m)} \cdot s + k/m = 0 \quad (33)$$

When the natural angular frequency $\omega 0$ is $\sqrt{(k/m)}$, the characteristic equation is given by the following expression (34).

$$s^2 + 2\zeta\omega 0 s + \omega 0^2 = 0 \quad (34)$$

When critical damping is achieved ($\zeta=1$), the expression (34) is rewritten to the following expression (35).

$$s^2 + 2\omega 0 s + \omega 0^2 = 0 \quad (35)$$

When critical damping is achieved ($\zeta=1$), the system is responsive and non-oscillatory.

In the present embodiment, the proportional gain $k_p$, the derivative gain $k_v$, the first gain $l_p$, and the second gain $l_v$ are set by using the response at the time critical damping is achieved as a target response.

Referring to FIG. 2, in the case where an object (plant) to be controlled of the present embodiment is represented by the simplified EPS model 92, equations of motion of the closed-loop system (the object to be controlled and the controller) of the present embodiment is given by the following expressions (36), (37), (38), (39).

$$J\ddot{\theta} = T - k\theta - c\dot{\theta} + k_p(\hat{\theta}-\bar{\theta}) + k_v(\dot{\hat{\theta}} - \dot{\bar{\theta}}) + \tilde{\mu}N - \mu N \quad (36)$$

$$J\ddot{\hat{\theta}} = T - k\hat{\theta} - c\dot{\hat{\theta}} + k_p(\hat{\theta}-\bar{\theta}) + k_v(\dot{\hat{\theta}} - \dot{\bar{\theta}}) + l_p(\theta-\hat{\theta}) + l_v(\dot{\theta}-\dot{\hat{\theta}}) \quad (37)$$

$$J\ddot{\bar{\theta}} = T - k\bar{\theta} - c\dot{\bar{\theta}} \quad (38)$$

$$T = T_{tb} + iT_a \quad (39)$$

The expression (36) is the equation of motion of the object to be controlled, the expression (37) is the equation of motion of the plant observer 48, and the expression (38) is the equation of motion of the reference model 43. $\mu N$ of the right side of the expression (36) represents the frictional force estimated value $\tilde{\mu}N(d\tilde{h})$, and $\mu N$ represents the actual frictional force $\mu N(dh)$. $\tilde{\mu}N - \mu N$ is a deviation of friction compensation.

$\phi = \theta - \hat{\theta}$ is defined as the error of the plant observer 48, and $\tilde{\phi} = \hat{\theta} - \bar{\theta}$ is defined as the error between the plant observer 48 and the reference model 43.

The following two equations (40), (41) representing the behavior of the control system are obtained from the above three equations (36), (37), (38) by using $\phi$ and $\tilde{\phi}$.

$$J\ddot{\phi} + (c + \sigma_2 N + 1_v)\dot{\phi} + (k+1_p)\phi = +\tilde{\mu}N - \mu N \quad (40)$$

$$J\ddot{\tilde{\phi}} + (c+k_v)\dot{\tilde{\phi}} + (k+k_p)\tilde{\phi} = l_p\phi + l_v\dot{\phi} \quad (41)$$

Characteristic equations corresponding to the equations (40), (41) are given by the following expressions (42), (43).

$$s^2 + \{(c+\sigma 2N+1_v)/J\}s + (k+1_p)/J = 0 \quad (42)$$

$$s^2 + \{(c+k_v)/J\}s + (k+k_p)/J = 0 \quad (43)$$

If the proportional gain $k_p$, the derivative gain $k_v$, the first gain $l_p$, and the second gain $l_v$ are set so that the characteristic equations (42), (43) have a double root (negative real number), the response corresponding to critical damping is obtained. The following expression (44) need be satisfied in order for the characteristic equation (42) to have a double root of s=−C1 (C1 is a positive real number), and the following expression (45) need be satisfied in order for the characteristic equation (43) to have a double root of s=−C2 (C2 is a positive real number).

$$(s-(-C1))^2 = s^2 + 2C1 \cdot s + C1^2 = 0 \quad (44)$$

$$(s-(-C2))^2 = s^2 + 2C2 \cdot s + C2^2 = 0 \quad (45)$$

The following expression (46) is obtained by comparing the coefficients of the expressions (42), (44), and the following expression (47) is obtained by comparing the coefficients of the expressions (43), (45).

$$C_1 = \frac{c + \sigma_2 N + l_v}{2J} = \sqrt{\frac{k+l_p}{J}} \quad (46)$$

$$C_2 = \frac{c + k_v}{2J} = \sqrt{\frac{k+k_p}{J}} \quad (47)$$

C1 is set to a desired value, and the first gain $l_p$ and the second gain $l_v$ are decided based on the expression (46). Similarly, C2 is set to a desired value, and the proportional gain $k_p$ and the derivative gain $k_v$ are decided based on the expression (47). C1 and C2 are parameters that design an intended response.

A highly responsive, non-oscillatory control system is thus implemented by deciding the proportional gain $k_p$, the derivative gain $k_v$, the first gain $l_p$, and the second gain l, in this manner.

In the above embodiment, the column rotation angle $\theta$ is the rotation angle of the steering shaft (column shaft) 6. However, the column rotation angle $\theta$ may be the rotation angle of the electric motor 18 (motor shaft).

In the above embodiment, the electric motor 18 is a DC motor with a brush. However, the electric motor 18 may be an electric motor other than a DC motor with a brush, such as a three-phase brushless motor.

Various design modifications may be made to the present invention without departing from the spirit and scope of the present invention.

What is claimed is:

1. An electric power steering system, comprising:
a power column including an electric motor and a speed reduction mechanism that amplifies motor torque of the electric motor;
an assist torque command value calculation unit that sets an assist torque command value of the electric motor;
an observer that calculates an estimated value of a rotation angle of the power column and an estimated value of a frictional force that is generated in the power column, by using an observer model and a friction force estimation unit, the observer model in which it is assumed that no friction is generated in the power column and whose characteristic is corrected by using an actual measurement value of a rotation angle of the electric motor and a model correction gain;
a reference model in which it is assumed that no friction is generated in the power column and which calculates a target value of the rotation angle of the power column;
a feedback manipulated variable calculation unit that calculates a feedback manipulated variable by performing a feedback operation on a deviation between the target value of the rotation angle of the power column and the estimated value of the rotation angle of the power column;
a motor torque command value calculation unit that calculates a motor torque command value by correcting the assist torque command value using the estimated value of the frictional force and the feedback manipulated variable; and
a motor current control unit that controls a motor current flowing in the electric motor so that the motor torque of the electric motor becomes equal to the motor torque command value; wherein
a feedback gain that is used in the feedback manipulated variable calculation unit and the model correction gain that is used in the observer are set so that a characteristic equation corresponding to an equation of motion representing behavior of the electric power steering system has a double root.

2. A gain setting method in an electric power steering system including
a power column including an electric motor and a speed reduction mechanism that amplifies motor torque of the electric motor,
an assist torque command value calculation unit that sets an assist torque command value of the electric motor,
an observer that calculates an estimated value of a rotation angle of the power column and an estimated value of a frictional force that is generated in the power column, by using an observer model and a friction force estimation unit, the observer model in which it is assumed that no friction is generated in the power column and whose characteristic is corrected by using an actual measurement value of a rotation angle of the electric motor and a model correction gain,
a reference model in which it is assumed that no friction is generated in the power column and which calculates a target value of the rotation angle of the power column,
a feedback manipulated variable calculation unit that calculates a feedback manipulated variable by performing a feedback operation on a deviation between the target value of the rotation angle of the power column and the estimated value of the rotation angle of the power column,
a motor torque command value calculation unit that calculates a motor torque command value by correcting the assist torque command value using the estimated value of the frictional force and the feedback manipulated variable, and
a motor current control unit that controls a motor current flowing in the electric motor so that the motor torque of the electric motor becomes equal to the motor torque command value, wherein
a feedback gain that is used in the feedback manipulated variable calculation unit and the model correction gain that is used in the observer are set so that a characteristic equation corresponding to an equation of motion representing behavior of the electric power steering system has a double root.

* * * * *